US006231792B1

(12) United States Patent
Overbeek et al.

(10) Patent No.: US 6,231,792 B1
(45) Date of Patent: May 15, 2001

(54) PRODUCTION OF COMPOSITE STRUCTURES

(75) Inventors: Rudolf A. Overbeek, Chatham Township; Ali M. Khonsari, Bloomfield; Yung-Feng Chang, Chatham; Lawrence L. Murrell, South Plainfield, all of NJ (US); Bruce J. Tatarchuk, Auburn, AL (US); Michael W. Meffert, Midlothian, VA (US)

(73) Assignee: ABB Lummus Global Inc., Bloomfield, NJ (US)

( * ) Notice: Subject to any disclaimer, the term of this patent is extended or adjusted under 35 U.S.C. 154(b) by 0 days.

(21) Appl. No.: 09/131,151

(22) Filed: Aug. 7, 1998

Related U.S. Application Data

(60) Provisional application No. 60/065,571, filed on Nov. 14, 1997, and provisional application No. 60/055,227, filed on Aug. 8, 1997.

(51) Int. Cl.[7] .................................................. B29C 65/00
(52) U.S. Cl. .............................. 264/43; 264/44; 264/628; 264/640; 419/2
(58) Field of Search ................................ 264/43, 44, 628, 264/640; 419/2

(56) References Cited

U.S. PATENT DOCUMENTS

| | | | | |
|---|---|---|---|---|
| 4,428,758 | * | 1/1984 | Montierth | 55/523 |
| 4,746,287 | * | 5/1988 | Lannutti | 431/328 |
| 4,868,142 | * | 9/1989 | Waisala et al. | 501/85 |
| 4,992,341 | * | 2/1991 | Smith et al. | 429/40 |
| 5,080,963 | | 1/1992 | Tatarchuk et al. | 428/225 |
| 5,096,661 | * | 3/1992 | Lang | 419/2 |
| 5,096,663 | | 3/1992 | Tatarchuk | 419/11 |
| 5,102,745 | | 4/1992 | Tatarchuk et al. | 428/605 |
| 5,304,330 | | 4/1994 | Tatarchuk et al. | 264/61 |
| 5,637,544 | * | 6/1997 | Shadman | 502/4 |
| 5,698,800 | * | 12/1997 | Hoshino et al. | 75/230 |

OTHER PUBLICATIONS

Marrion, et al., *Journal of Power Sources,* vol. 47, pp. 297–302 (1994).

* cited by examiner

*Primary Examiner*—Christopher A. Fiorilla
(74) *Attorney, Agent, or Firm*—Elliot M. Olstein; Raymond J. Lillie

(57) ABSTRACT

A porous composite product comprised of a network of fibers is produced by forming an unsintered preformed network of fibers and a gasifiable structure forming agent, followed by gasification of the structure forming agent prior to sintering of the fibers at appropriate junction points. The preferred structure forming agent is a cellulosic material.

12 Claims, No Drawings

PRODUCTION OF COMPOSITE STRUCTURES

This application claims the priority of U.S. Provisional Application No. 60/055,227, filed on Aug. 8, 1997 and U.S. Provisional Application No. 60/065,571, filed Nov. 14, 1997.

This invention relates to the production of composite structures, and more particularly, to the production of porous products comprised of a fibrous network of material.

U.S. Pat. Nos. 5,304,330; 5,080,963, 5,102,745; and 5,096,663 are directed to the production of porous composites comprised of a fibrous network of material. In accordance with such production, there is a provided a mixture comprised of fibers for forming the porous composite and a structure forming agent which functions as a binder (in particular, a cellulosic material), which are dispersed in an appropriate liquid. After preforming into a desired form, liquid is removed and the composite is heated to a temperature to effect sintering of the fibers at junction points to produce a porous composite comprised of a three-dimensional network of fibers. The structure forming agent, in particular, a cellulosic material, is removed during the sintering process or may be removed after the sintering process.

The present invention is directed to a process for producing a porous composite comprised of a fibrous network of materials wherein the structure forming agent or binder is gasified prior to sintering of the fibers at junction points.

The gasification, prior to sintering, is effected to gasify at least 50% of the structure forming agent or binder, preferably at least 70% and more preferably at least 90%. In many cases, at least 95% up to 99% or better of the binder is gasified prior to sintering.

The gasification of binder or structure forming agent, which may include polymer fiber or cellulose fibers, may be accomplished, for example, by heating the fibrous network to a gasification temperature which is below the sintering temperature for the fibrous network. The temperature which is used is dependent in part on the binder, the sintering temperature of the fibrous network and the amount of binder which is to be removed.

The gasification of binder may be accomplished in a wide variety of atmospheres and with or without a catalyst, and with a series of different pretreatment steps, if desired. Thus, the gasification may be effected in an inert atmosphere in the presence or absence of steam with or without catalyst; or in the presence of oxygen or oxygen in an essentially inert gas with or without the presence of a catalyst, or in the presence of hydrogen with or without a catalyst or in the presence of a combination of hydrogen and steam with or without catalyst or in the presence of oxygen and steam with and without catalyst in any number or sequence of pretreatment steps.

In the case where gasification below sintering temperatures does not remove essentially all of the binder, the remainder of the binder may be gasified at the sintering temperature. The choice of sintering temperature or temperatures depends on the metal or alloy used, metal fiber diameter, sintering time, and the desired physical properties in the final metal fiber mat structure, or that of the composite structure, or that of the composite structure consisting of other fibers or inorganic particles.

If a catalyst is used, the catalyst is one which permits the binder or structure forming agent to be gasified at temperatures lower than the temperatures at which the fibers forming the composite will be sintered. As hereinabove indicated, in accordance with a preferred embodiment, the binder or structure forming agent is a polymer fiber or a cellulosic material. In accordance with such preferred embodiment, the catalyst which is employed for permitting gasification of the cellulosic material at temperatures below the sintering temperatures may be one or more of the following oxide or metal catalysts or, combinations thereof. As an example, oxide catalysts may be potassium hydroxide, vanadium oxide, calcium hydroxide, rhenium oxide, ruthenium oxide. Metal catalyst can be one or more of the following catalysts: platinum, palladium, ruthenium, rhodium, nickel, etc. These and other catalysts should be apparent to those skilled in the art from the teachings herein. The catalyst, if used, may be part of the binder or may be added to the preform.

In the case where steam is used, steam may be added or the steam can be generated in situ from, for example, residual water present in the composite or by "wetting" the composite. In general, the steam is added in an amount of from 0.05 to 97 volume percent The gasification may be effected at a temperature of less than 400° C. and more generally at a temperature less than 350° C.

In another embodiment, the binder can be gasified by the generation of free radicals such as the use of plasma to generate such radicals.

In the case where the preform includes a metal which can be oxidized and the oxidation is not easily reversed, the gasification is preferably accomplished in a reducing atmosphere.

As hereinabove indicated, the preferred binder or structure forming agent is a cellulosic material, which may be cellulose or a cellulose derivative.

As hereinabove noted, the procedure and materials for producing a porous composite comprised of a network of fibers is described in the aforementioned U.S. patents. As described therein, the fibers employed in producing the composite may be metal and/or carbon and/or a ceramic. In producing such a composite, the fibers may be formed from one or more metals and may be formed from one or more metals and may further include carbon and/or ceramic fibers.

Illustrative but not exhaustive examples of metal fibers which may be used in the practice of this invention include aluminum, titanium, vanadium, chromium, iron, cobalt, nickel, copper, zinc, zirconium, niobium, molybdenum, ruthenium, rhodium, palladium, silver, cadmium, indium, tin, hafnium, tantalum, tungsten, rhenium, osmium, platinum, gold, antimony, beryllium, iridium, silicon, magnesium, manganese, gallium, and combinations of the above. Metal alloys also may be used in the practice of this invention, as exemplified by constantin, hastelloy, nichrome, inconel, monel, carpenter's metal, and various steels, especially stainless steels, and other alloys. As can be appreciated, there is enormous flexibility in the choice of metal fibers which adds to the attractiveness of our invention.

The diameter of the fibers may vary over a wide range. Thus, for example, the fiber diameter may be as low as about 0.5 micron or may be up to 25 microns or more. The selection of a specific diameter is within the scope of those skilled in the art from the teachings herein.

In producing the composite, the dispersion which includes the fibers and the structure forming agent may further include particles which are to be entrapped in the interstices of the mesh-like structure of the composite. In a preferred embodiment, such particles may be a catalyst, a catalyst support, a catalyst precursor or a supported catalyst or a supported catalyst precursor. When such particles are included in the dispersion, such particles become entrapped in the interstices of the mesh.

The fibers and other components, if any, are dispersed in a liquid by any suitable means. It is not essential to have a uniform dispersion, although often such uniformity is desirable. Dispersion may be effected by such means as sonication, agitation, ball milling, and so forth. The purpose of the liquid is merely to facilitate effective dispersion of the solids, especially where one wants as uniform a dispersion as is feasible in the final preform. Normally the liquid used will be unreactive with the other components of the dispersion, but one can envisage special cases where a functionally desirable reactive property of the medium may be advantageously combined with its fluidity. Since the liquid is later removed, it is clear that it should be readily removable, as by volatilization. Water is normally a quite suitable liquid, although water-alcohol mixtures, and especially water-glycol mixtures, may be used. Illustrative examples of other liquids include methanol, ethanol, propanol, ethylene glycol, propylene glycol, butylene glycol, poly(ethylene glycol)(s), poly(propylene glycol)(s), and so forth. Other organic liquids also may be used, but normally without any advantages. The liquid medium also may contain salts where these are desirable, and the greater solubility of salts in water relative to organic media also make the use of water highly advantageous. While some mixtures of the above-noted liquids are used to adjust the viscosity of the dispersion so that filtering or settling onto a screen or filter provides a certain degree of uniformity within the "wet" preform regardless of the densities and drag forces acting on the various particulates, still other additives including surfactants and dispersing agents can be used to assist in the mixing process and also to preferentially associate at least two of the solids with one another in the preform.

The structure forming agents which are employed are chosen so that they can be volatized or gasified, with such structure forming agent preferably being capable of being gasified to at least 90% and more preferably to at least 95% and still more preferably to at least 99%, all by weight.

Among the structure forming agents which may be used in the practice of this invention are cellulose, organic resins such as polyvinyl alcohol, polyurethanes, and styrene-butadiene latex, and thermosets such as epoxies, urea-formaldehyde resins, melamine-formaldehyde resins, and polyamide-polyamine epichlorohydrin resins. Cellulose, in all its forms and modifications, is a desirable structure forming agent because it volatilizes completely at relatively low temperatures with little ash formation and is unreactive toward other components in the preform.

The structure forming agent is present in the preform at a range from about 2 to about 90 weight percent. That minimum amount of structure forming agent is that which is necessary to give a stable preform, that is, one which can be handled, shaped, and so forth, which amount depends upon fiber loading, fiber size, and so forth. The amount of structure forming agent present in the preform will influence the void volume of the final composite, with a higher structure forming agent content affording a higher void volume, hence the structure forming agent can be used as one independent variable to control this property. Where two metal fibers are used with different fiber sizes, the amount of the smaller sized fiber also may be used to vary void volume and pore size. A range from about 25 to about 60 weight percent of cellulose in the preform is typical.

After the dispersion of fibers, optional components, and structure forming agent in a liquid is attained, the solids are collected as a mat. Excess liquid may be removed, such as by pressing, and the resulting solid dispersion often is dried (i.e., liquid is removed), especially where it is to be stored prior to further treatment.

In accordance with the present invention, after producing the preform, and prior to sintering fibers at junction points, the structure forming agent or binder is gasified.

After the structure forming agent is gasified, the fibers are sintered at appropriate junction points, which may be all or only some of the junction points, in order to produce the composite. The fibers are sintered at the junction point by heating the composite to a temperature at which sintering of the materials forming the mesh is effected. The sintering is preferably effected in a reducing atmosphere, which may be provided by having hydrogen present during the sintering. Typical sintering temperatures are at least 600° C. and generally do not exceed 1200° C.

In some cases, after sintering, the composite may be heated with oxygen at elevated temperatures to remove any carbon or coke formed during the gasification.

The composites produced in accordance with the present invention have a wide variety of applications. One such application involves the use of such composites as a catalyst structure, with catalysts either being coated onto the fibers, or being entrained and retained in the interstices of the mesh-like structure.

In employing of such composite as a catalyst structure, the void volume of the composite having catalyst particles retained in the interstices thereof, or coated onto the fiber, should be at least 45%, and is preferably at least 55% and is more preferably at least 65%. In general, the void volume does not exceed 99% and, in some cases, does not exceed 90 or 95%. The term "void volume" as used herein is determined by dividing the volume of the mesh layer which is open (free of catalyst particles and material forming the mesh) by the total volume of the mesh layer (openings, mesh material and particles) and multiplying by 100.

In the case where particles are entrained in the interstices of the mesh, the average particle size is generally no greater than 300 microns and is preferably no greater than 200 microns, and in preferred embodiments is no greater than 100 microns. In general, the average particle size is at least 10 microns, and is preferably at least 20 microns, and in most cases, is greater than 50 microns. Average particle size may be determined, for example, by In a preferred embodiment, such catalyst structure is employed in a fixed bed reactor.

The present invention will be further described with respect to the following examples; however, the scope of the invention is not to be limited thereby:

The following description is characteristic of the procedure used for pre-removal of cellulose from composite materials.

Materials. Nickel and stainless steel fibers (Memtec) were used as received.

Preform Fabrication. The paper preforms were prepared according to TAPPI Standard 205 using Noram equipment. Normally, the metal fibers and cellulose fibers were combined simultaneously and mixed at 50 Hz for 5 minutes in approximately 10 liters of water. This dispersed mixture was collected on a 1000 $cu^2$ square sheet mold as a wet composite preform. The wet preforms were dried overnight in air at 60° C.

Pre-Removal of Cellulose from Composite Preforms. The dried preforms were normally cut into ca 200 $cm^2$ squares (14 cm×14 cm) and assembled into stacks composed of six to ten individual preform squares each separated by similar size screens made of a heat resistant stainless steel. When the effect of a nickel catalyst was investigated, samples were each wetted with ca 7 mL of a 0.025 wt % Ni (from nickel nitrate) in water solution before stacking. The samples were then placed in a high temperature oven (Grieve) of approximately 3 ft³ total volume. The cellulose pre-removal was performed in various atmospheres typically with a gas flow rate of 5–50 liters/min (STP) at a total pressure of 1 atmosphere and temperatures between 250° C. and 500° C.

EXAMPLE 1

Several composite preforms were each prepared with 12.0 g of 4 μm nickel fibers and 8.0 g of cellulose according to the procedure mentioned above. Briefly, these components were agitated at 50 Hz for 5 minutes in 10 liters of water and prepared as wet preforms by settling onto a 1000 cm² sheet mold. After drying overnight, the preforms were cut into pieces and six 200 cm² squares were stacked together as described above. The total initial dry weight of the six preforms was 22.06 g. These preforms were then placed into the Grieve oven at 300 C for 15 minutes with a $N_2$ flow of 20 SLPM (standard liters per minute) The preforms were then removed from the oven and quickly weighed. The total final weight of the preforms was 15.70 g, a net loss of 6.36 g. Based on an initial cellulose weight content of 40%, the initial weight of cellulose in the preforms was 8.824 g. Therefore, 72.1% of the initial cellulose was removed from the preforms.

EXAMPLE 2

Several composite preforms were each prepared with 12.0 g of 4 μm nickel fibers and 8.0 g of cellulose according to the procedure mentioned above. Briefly, these components were agitated at 50 Hz for 5 minutes in 10 liters of water and prepared as wet preforms by settling onto a 1000 cm² sheet mold. After drying overnight, the preforms were cut into pieces and six 200 cm² squares were wetted with 7 mL each of 0.025 wt % Ni (from nickel nitrate) in water solution. The total initial dry weight of the six preforms was 23.31 g. These preforms were then stacked as described above. These preforms were then placed (still wetted) into the Grieve oven at 400° C. for 20 minutes with a $N_2$ flow of 20 SLPM (standard liters per minute) sparged through 500 mL of water. The preforms were then removed from the oven and quickly weighed. The total final weight of the preforms was 14.25 g, a net loss of 9.06 g. Based on an initial cellulose weight content of 40%, the initial weight of cellulose in the preforms was 9.32 g. Therefore, 97.2% of the cellulose was removed from the preforms.

The present invention is particularly advantageous in that by removing binder at temperatures less than the sintering temperature for the fibers the sintering can be accomplished at lower temperatures. In addition, better joints are formed if sintering is effected after removal of the binder.

Numerous modifications and variations of the present invention are possible in light of the above teachings and, therefore, within the scope of the appended claims, the invention may be practiced otherwise than as particularly described.

What is claimed is:

1. A process for producing a porous product comprising a network of fibers, comprising:

producing a preform comprising an unsintered network of fibers and a gasifiable structure forming agent;

in a first step, gasifying, in the presence of oxygen and steam, at least 50% of the structure forming agent by heating and maintaining the preform at a gasification temperature for a time sufficient to gasify at least 50% of the structure forming agent, said gasification temperature being a temperature below the temperature at which the fibers are sintered; and in a second step, sintering fibers of the preform by maintaining the preform resulting from said first step at a sintering temperature for a period of time sufficient to sinter said fibers at at least a portion of junction points of the fibers, said sintering temperature being higher than said gasification temperature.

2. The process of claim 1, wherein the structure forming agent is a cellulosic material.

3. The process of claim 2 wherein the fibers are metal fibers.

4. The process of claim 1 wherein the gasifying is effected at a temperature of less than 400° C.

5. The process of claim 1 wherein at least 70% of the structure forming agent is gasified at said gasification temperature.

6. The process of claim 5 wherein at least 90% of the structure forming agent is gasified at said gasification temperature.

7. The process of claim 1 wherein the fibers are at least one member selected from the group consisting of metal fibers, ceramic fibers and carbon fibers.

8. A process for producing a porous product comprising a network of metal fibers, comprising:

producing a preform comprising an unsintered network of metal fibers and a gasifiable structure forming agent, said structure forming agent being formed of a cellulosic material, and wherein said preform has particles of a catalyst support retained in the interstices of said fiber network, and wherein said catalyst support supports a catalyst or catalyst precursor;

in a first step, gasifying at least 50% of the structure forming agent by heating and maintaining the preform at a gasification temperature for a time sufficient to gasify at least 50% of the structure forming agent, said gasification temperature being a temperature below the temperature at which the fibers are sintered; and in a second step, sintering fibers of the preform by maintaining the preform resulting from said first step at a sintering temperature for a period of time sufficient to sinter said fibers at at least a portion of junction points of the fibers, said sintering temperature being higher than said gasification temperature.

9. The process of claim 8 wherein the gasifying is effected in the presence of oxygen and steam.

10. The process of claim 8 wherein the gasifying is effected at a temperature of less than 400° C.

11. The process of claim 8 wherein at least 70% of the structure forming agent is gasified at said gasification temperature.

12. The process of claim 11 wherein at least 90% of the structure forming agent is gasified at said gasification temperature.

* * * * *